UNITED STATES PATENT OFFICE.

EUGEN ANDERWERT, HERMANN FRITZSCHE, AND HEINRICH SCHOBEL, OF BASEL, SWITZERLAND, ASSIGNORS TO SOCIETY OF CHEMICAL INDUSTRY IN BASLE, OF BASEL, SWITZERLAND.

SUBSTANTIVE ORTHOOXYAZO DYESTUFFS AND PROCESS OF MAKING SAME.

1,282,354.  Specification of Letters Patent.  Patented Oct. 22, 1918.

No Drawing.  Application filed October 6, 1915.  Serial No. 54,403.

*To all whom it may concern:*

Be it known that we, EUGEN ANDERWERT, HERMANN FRITZSCHE, and HEINRICH SCHOBEL, all three chemists and citizens of the Swiss Republic, and residents of Basel, Switzerland, have invented new Substantive Orthooxyazo Dyestuffs and Processes of Making Same, of which the following is a full, clear, and exact specification.

Orthoamidophenol and its derivatives have been employed hitherto exclusively for the manufacture of orthooxyazodyestuffs dyeing mordanted wool, and never for the manufacture of substantive dyestuffs dyeing unmordanted cotton. We have now found that the azodyestuffs containing a diazoderivative of orthoamidophenol or of one of its derivatives on the one hand and a 2:5:7-aminonaphtholsulfonic compound corresponding to the formula

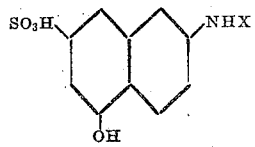

wherein X stands for

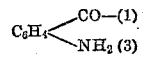

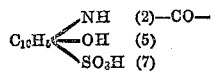

or

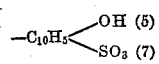

on the other hand have the property of substantive azodyestuffs, that is to dye cotton and other fibers without mordant.

The new orthooxyazodyestuffs derived from these 2:5:7-aminonaphtholsulfonic or 2:5:7-aminonaphtholdisulfonic compounds constitute intense colored powders, yielding with concentrated sulfuric acid deep colored solutions dissolving in water to solutions changing intensively their coloration on addition of sodium carbonate or of soda lye and dyeing cotton, wool, silk, mixed goods, straw, wood and paper according to the methods used for the known substantive dyestuffs. They can be prepared by combining an orthooxydiazobody of the aromatic series only with a 2:5:7-aminonaphtholsulfonic or 2:5:1:7-amino- naphtholdisulfonic compound or by combining first 1 molecule of an orthooxydiazobody of the aromatic series with 1 molecule of a 2:5:7-aminonaphtholsulfonic or 2:5:1:7-aminonaphtholdisulfonic compound and afterward the resulting intermediate product with 1 molecule of an aromatic diazobody.

The invention is illustrated by the following examples:

Example 1: 15.4 kg. 4:2:1-nitroaminophenol are diazotized in the usual way and the resulting diazocompound is poured into a solution of 37 kg. metaaminobenzoyl-2:5:7-aminonaphtholsulfonic acid and of 30 kg. sodium carbonate in water. After 24 hours the mass is heated to 40° C. and the dyestuff precipitated by addition of common salt and isolated as usual. It dissolves in water to a violet solution turning to red on addition of NaOH and dyes cotton dull roseate shades. Diazotized on the fiber and developed with betanaphthol the tints become more yellowish.

Example 2: The diazoderivative of 15.4 kg. nitroaminophenol is poured into a solution of 52 kg.

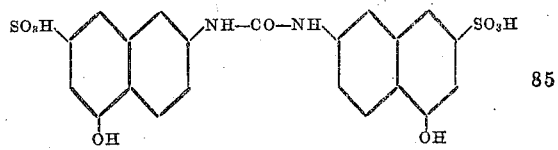

and of 30 kg. sodium carbonate in water. After a short time the combination is achieved and the dyestuff is isolated in the usual manner. It dissolves in water to a violet solution, turning to brownish-red on addition of NaOH and dyes cotton dull blue-violet shades which become dull chestnut-brown, when developed on the fiber with paranitrodiazobenzene.

Example 3: 37:8 kg. orthoamidophenolsulfonic acid are converted into the corresponding diazocompound and this latter is poured into a solution of 50.4 kg.

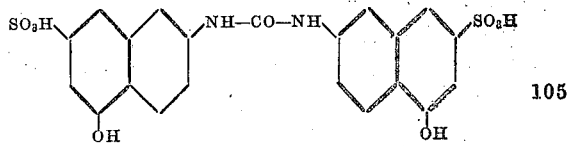

and of 50 kg. sodium carbonate in water.

After 24 hours the dyestuff is separated as usual. It dissolves in water to a cherry-red solution becoming bluish-red on addition of NaOH and dyes cotton scarlet-red tints.

Example 4: To a solution of 50.4 kg. of the derivative of 2:5:7-aminonaphtholsulfonic acid employed in Example 3 and of 50 kg. of sodium carbonate in water is added the diazoderivative of 30.8 kg. 4:2:1-nitro-aminophenol and after 24 hours the dyestuff is isolated in the usual manner. It dissolves in water to a blue solution turning to bluish-red on addition of NaOH and dyes cotton roseate tints.

Instead of the diazophenol derivatives indicated in the examples, can be employed the corresponding diazoacidylphenol derivatives able to combine more easily, the resulting dyestuffs being saponified after their preparation.

The new dyestuffs are not only suitable for dyeing cotton, wool, silk, leather, straw, wood, paper, mixed goods, etc., like the known substantive dyestuffs, but also for the production of lakes and as parent materials for the production of valuable new derivatives.

What we claim is:

1. The described process for the manufacture of new substantive orthooxyazodyestuffs consisting in combining an orthooxydiazobody of the aromatic series with a 2:5:7-aminonaphtholsulfonic compound corresponding to the formula

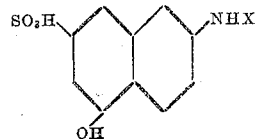

wherein X stands for

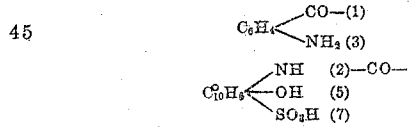

or

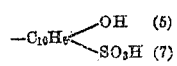

2. The described process for the manufacture of new substantive orthooxydyestuffs consisting in combining first 1 molecule of an orthooxydiazobody of the aromatic series with 1 molecule of a 2:5:7-aminonaphtholsulfonic compound corresponding to the formula

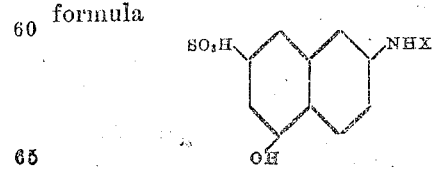

wherein X stands for

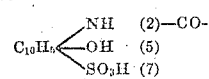

or

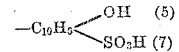

and afterward the resulting intermediate product with 1 molecule of an aromatic diazobody.

3. As new products the described orthooxyazodyestuffs derived from an orthooxydiazobody of the aromatic series and a 2:5:7-aminonaphtholsulfonic compound corresponding to the formula

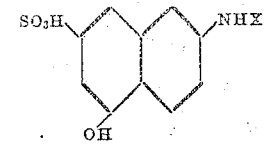

wherein X stands for

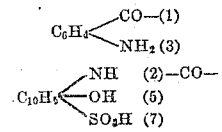

or

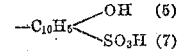

constituting intense colored powders, yielding with concentrated sulfuric acid deep colored solutions, dissolving in water to solutions changing their coloration intensively on addition of sodium carbonate or of soda lye and dyeing cotton, wool, silk, mixed goods, straw, wood and paper according to the methods used for the known substantive dyestuffs.

4. As new products the described orthooxyazodyestuffs derived from 1 molecule of an orthooxydiazobody of the aromatic series, 1 molecule of a further aromatic diazobody and 1 molecule of a 2:5:7-aminonaphtholsulfonic compound corresponding to the formula

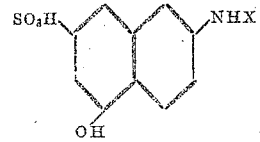

wherein X stands for

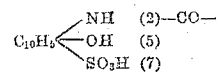

or

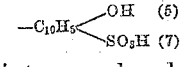

constituting intense colored powders, yielding with concentrated sulfuric acid deep colored solutions, dissolving in water to solutions changing their colorations intensively on addition of sodium carbonate or of soda lye and dyeing cotton, wool, silk, mixed goods, straw, wood and paper according to the methods used for the known substantive dyestuffs.

In witness whereof we have hereunto signed our names this 17th day of September 1915, in the presence of two subscribing witnesses.

EUGEN ANDERWERT.
 Dr. HERMANN FRITZSCHE.
 Dr. HEINRICH SCHOBEL.

Witnesses:
 Arnold Zuber,
 Armand Ritter.